3,188,913
REAR VIEWING MIRRORS
William Edward O'Shei, Harlington, England; John Risdon Amphlett and George Crooks Bell, executors of said William Edward O'Shei, deceased
Filed Aug. 15, 1960, Ser. No. 49,769
Claims priority, application Great Britain, Aug. 25, 1959, 29,056/59
1 Claim. (Cl. 88—98)

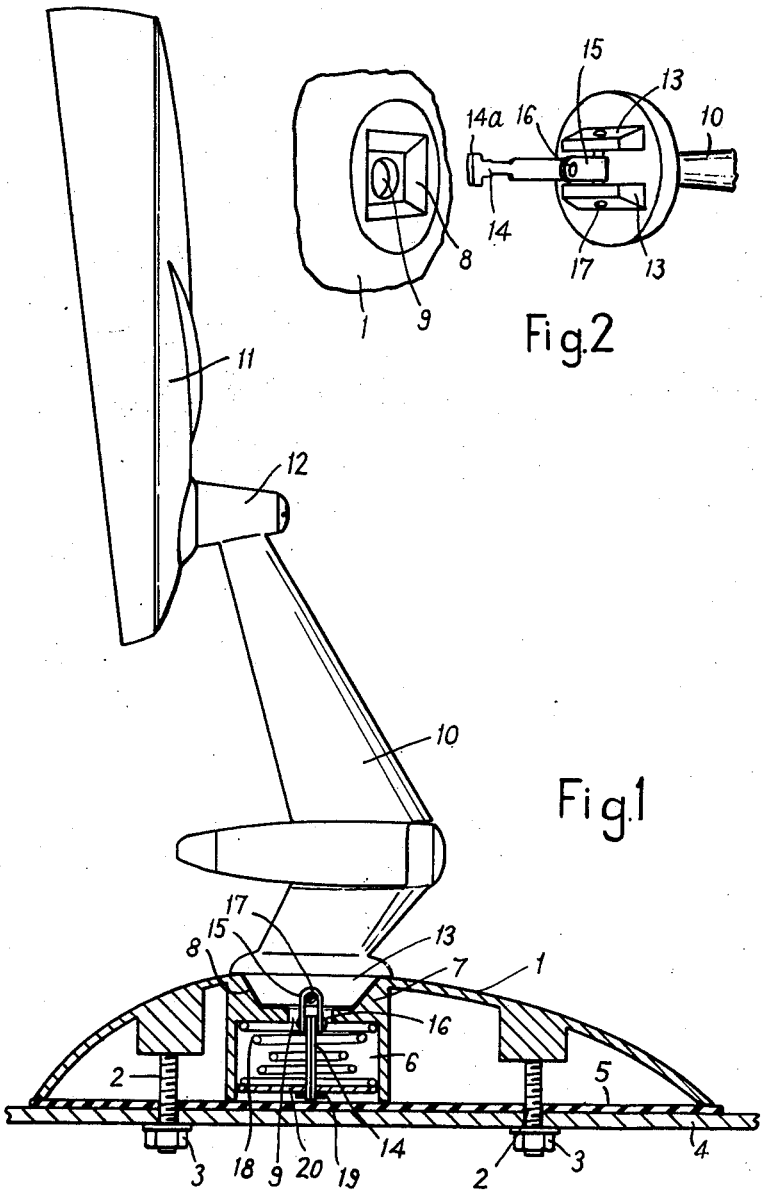

The present invention relates to a rear viewing mirror for vehicles of the kind in which the mirror is supported from a base part, which is adapted to be firmly secured to the vehicle, by means of a flexible joint of which the parts are urged into positively located interengaging relation by a spring, and which, upon the mirror being pushed or hit, allows the mirror to turn and/or rock relative to the base part, thereby reducing the risk of damage to the mirror and also of injury to a person who may strike or be struck by the mirror.

In order to prevent the mirror from vibrating or moving under the high wind pressures exerted thereon when the vehicle is travelling at speed, the spring has to be made quite strong. Furthermore it has to be compressible through a distance sufficient to allow the interengaging parts of the flexible joint to move apart sufficiently so that they can turn and/or rock relative to one another under the force of the impact. In the known constructions as described in British specifications Nos. 746,275, 746,366 and 746,370, the spring has projected below the base part being enclosed in a threaded tubular spigot by which the base part can be secured to the vehicle. Thus for fixing the mirror to a vehicle, a correspondingly large diameter hole has to be drilled in the wing or other part where the mirror is to be fixed. To simplify the fixing, specification No. 775,594 describes a modification in which the spring is incorporated in the supporting arm or stanchion, but in this case the size of the spring imposes limitations on the minimum diameter and design of the stanchion.

The present invention has for its object to provide a rear viewing mirror of the above-mentioned kind which incorporates a spring of such construction that its length is considerably reduced while still possessing the required strength and extent of compressibility, whereby the fixing may be simplified while providing greater freedom in design.

The present invention consists in a rear viewing mirror of the kind referred to, wherein the spring comprises a helical compression spring of which the turns so vary in diameter that the spring has a double-conical or double-tapering shape.

Preferably the diameters of the turns increase successively in both directions from approximately midway along the axial length of the spring. Alternatively, the maximum diameter of the spring may be approximately midway along its axial length, the diameters of the turns decreasing towards the opposite ends of the helical coil.

Due to its construction, the turns of the spring partially nest within one another when the spring is compressed, thereby enabling a greater degree of axial compression of the spring than if its turns were of uniform diameter. Furthermore, the double taper construction enables the spring, for a given axial length and a given maximum diameter, to incorporate a greater length of wire than if the spring were wound with a single taper, thereby giving increased flexibility and compressibility.

The invention also consists in a rear viewing mirror comprising a base part adapted to be firmly secured to a vehicle body, said base part having a cavity formed with a wall against which abuts a stanchion or arm which carries the mirror, the said wall having an aperture through which a coupling member projecting from the stanchion passes into the cavity and the abutting surfaces of said wall and stanchion being provided with interengaging means for indexing the stanchion in a predetermined angular position with respect to the base part and being urged into abutting engagement by a helical spring which is disposed within said cavity, the turns of said helical spring being of varying diameter so that the spring has a double-tapering or double-conical shape.

In order that the invention may be more clearly understood, reference will now be made to the accompanying drawing, in which:

FIGURE 1 shows a cross-section through one embodiment of the invention.

FIGURE 2 is an exploded perspective view of the interengaging parts of the joint.

Referring to the drawing, the base part 1, which may be made as a hollow metal die-casting, is provided with threaded spigots 2 by means of which, and the nuts 3, the base part may be secured to the vehicle body 4. A rubber gasket 5 may be interposed between the base part and the vehicle body. The base part 1 is formed with a cylindrical cavity 6, the upper wall 7 of which is formed with a truncated pyramidal recess 8 and has a central aperture 9. 10 is the mirror stanchion, to the upper end of which the mirror 11 is secured by an adjustable connection 12 which may be tightened or locked in the adjusted position. The stanchion 10 is provided at its bottom end with a truncated pyramidal projection 13 complementary to the recess 8 in the base part. To the bottom of the stanchion is connected a rod 14 by means of a link 15 which is pivotally connected at one end to the rod by a pin 16 and at its other end to the stanchion by means of the pin 17 which bridges a gap in the projection 13. The pins 16 and 17 are at right angles to one another whereby the link constitutes a universal joint connecting the rod 14 to the stanchion.

Within the cavity 6 is arranged a helical compression spring 18 of which the helical turns vary in diameter so that the spring has a double-conical shape. The diameters of the turns increase progressively in both directions from approximately the centre of its axial length. The turns at each end are of approximately the same diameter. The upper end of the spring bears against the underside of the wall 7 and the lower end of the spring is retained by a washer 20, of a diameter approximately the same as the internal diameter of the cavity 6, which is secured to the lower end of the rod 14. The washer may be secured by a second washer 19 provided with a slot which fits over the flattened head 14a on the rod, the washer then being turned through a right angle so that it will be retained by the head 14a.

The spring 18 is thus held compressed and urges the abutting surfaces of the stanchion and base parts together with the frustro-pyramidal projection and the cavity in inter-engagement so as to locate the stanchion in a predetermined indexed position relative to the base part. Upon the mirror being pushed or hit, the stanchion can turn about the axis of the coupling member 14–15 by reason of the inclined surfaces of the projection 13 riding up the inclined surfaces of the recess 8, this movement causing the spring to be further compressed. The stanchion is also free to rock in all directions about the axis of turning, the rocking freedom being permitted by the universal joint and again taking place against the action of the spring. The spring tends to restore the stanchion to its predetermined location on the base part so long as the stanchion is not turned through an angle greater than 45°. If it does not self-restore, it may be assisted manually back to the predetermined located position. If turned by more than 45°, the stanchion tends to index in another position, but can easily be restored by hand to the correct position.

Due to the double-tapering form of the spring 18, the turns thereof can nest within one another when the spring is compressed, thereby enabling the coupling member to be displaced in the axial direction by a distance which is only slightly less than the overall depth of the cavity 6.

Whilst a particular embodiment has been described, it will be understood that various modifications may be made without departing from the scope of the invention. For example, the universal joint may be constructed in other ways, for example by a length of flexible cable which may, if desired, also serve as the rod 14. Alternatively the rod 14 may be rigidly connected to the base of the stanchion in which case the aperture 9 in the upper wall of the base part should be made sufficiently large to allow the desired rocking movement. Of course, if only turning movement of the stanchion relative to the base part is required, the aperture 9 can be dimensioned to form a bearing for the rod.

Although the interengaging parts of the stanchion and the base parts are preferably of rectangular frustro-pyramidal form as shown, other shapes may be used. For example one of the parts may be formed with a V-groove and the other part with a V-shaped projection, or the parts may be formed with radial interengaging corrugations. The number of indexing positions around the axis may be determined as required, but is preferably small, for example not more than six or eight, so that if the stanchion is displaced from its predetermined located position for correct rear viewing, such displacement will be readily observed.

Although the invention has been described in connection with rear viewing mirrors for exterior fitting, the invention can also be applied to interior mirrors.

Instead of locating the spring in the base part, it may alternatively be located in a cavity in the bottom of the stanchion. Due to the short axial length of the spring, it can be accommodated in a boss at the bottom of the stanchion without restricting the design and shape of the main part of the stanchion. In some designs the spring may alternatively be located in the casing which embraces the mirror glass.

I claim:

A rear viewing mirror for vehicles comprising a base part having a top surface and a bottom surface, securing means extending below said bottom surface for securing said base part to a vehicle body, a cavity formed within said base part and extending between said top and bottom surface, the upper end of said cavity having a wall constituting a part of said top surface and having its lower end open, a stanchion supporting a mirror and abutting against said wall, said wall having an aperture through which a coupling member projecting from the stanchion passes into the cavity, and the abutting surfaces of said wall and stanchion being provided with inter-engaging means for indexing the stanchion in a predetermined angular position with respect to the base part, and a helical wire compression spring disposed entirely in said cavity surrounding said coupling member and compressed between the underside of said wall and a washer adjacent the end of the coupling member, the turns of said helical spring being of varying diameter so that the spring is of double-tapering shape and so that adjacent turns nest within one another when the spring is fully compressed, whereby the spring can be compressed to a length equal to only twice the thickness of the spring wire.

References Cited by the Examiner

UNITED STATES PATENTS

| | | | |
|---|---|---|---|
| 1,124,708 | 1/15 | Crawford | 267—60 |
| 2,053,674 | 9/36 | Mellen | 88—93 |
| 2,073,968 | 3/37 | Krebs | 88—79 |
| 2,161,165 | 6/39 | Hirschman | 267—61 X |
| 2,724,996 | 11/55 | O'Shei | 88—98 |
| 2,914,988 | 12/59 | O'Shei | 88—98 |

JEWELL H. PEDERSEN, *Primary Examiner.*

EMIL G. ANDERSON, FREDERICK M. STRADER, *Examiners.*